(12) United States Patent
Forsyth

(10) Patent No.: US 7,759,929 B2
(45) Date of Patent: Jul. 20, 2010

(54) SYSTEM AND METHOD FOR DETERMINING AN ANGLE OF ROTATION WITH CASCADE SENSORS

(75) Inventor: Richard Forsyth, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 300 days.

(21) Appl. No.: 11/887,802

(22) PCT Filed: Mar. 6, 2006

(86) PCT No.: PCT/EP2006/002038

§ 371 (c)(1), (2), (4) Date: Oct. 1, 2007

(87) PCT Pub. No.: WO2006/102967

PCT Pub. Date: Oct. 5, 2006

(65) Prior Publication Data

US 2009/0051351 A1 Feb. 26, 2009

(30) Foreign Application Priority Data

Mar. 30, 2005 (DE) ........................ 10 2005 014 509

(51) Int. Cl.
*G01B 7/30* (2006.01)

(52) U.S. Cl. ............................. 324/207.2; 324/207.25; 324/207.24

(58) Field of Classification Search ........................ None
See application file for complete search history.

(56) References Cited

U.S. PATENT DOCUMENTS

| 5,075,628 | A | * | 12/1991 | Schuster et al. ............. 324/510 |
| 6,104,187 | A | | 8/2000 | Marx et al. |
| 6,768,301 | B1 | | 7/2004 | Hohe et al. |
| 2004/0061494 | A1 | | 4/2004 | Koike et al. |

FOREIGN PATENT DOCUMENTS

| DE | 195 38 490 | | 12/1996 |
| JP | 02186284 | A * | 7/1990 |
| WO | WO 03/060537 | | 7/2003 |

OTHER PUBLICATIONS

B. Travis, "Hall-Effect Sensor ICS Sport Magnetic Personalities" EDN Electrical Design News, Reed Business Information, pp. 81-82, 84, 86, 88, Apr. 9, 1998.

* cited by examiner

*Primary Examiner*—Jay M Patidar
(74) *Attorney, Agent, or Firm*—Cohen Pontani Lieberman & Pavane LLP

(57) ABSTRACT

A sensor arrangement for detecting an angle of rotation of a rotating body. At least one first sensor and one second sensor are connected to one another in a cascade in such a manner that the sensor signal from the first sensor is converted into a first control current which is applied as a bias current to the second sensor, the two angular dependencies of the first and second sensors being multiplied. This achieves improved interpolation when determining the angle of rotation on the basis of the sensor signals provided by the sensor arrangement.

18 Claims, 4 Drawing Sheets

SYSTEM AND METHOD FOR DETERMINING AN ANGLE OF ROTATION WITH CASCADE SENSORS

RELATED APPLICATIONS

This is a U.S. national stage of application No. PCT/EP2006/002038, filed on 6 Mar. 2006.

This patent application claims the priority of German patent application no. 10 2005 014 509.4 filed Mar. 30, 2005, the disclosure content of which is hereby incorporated by reference.

FIELD OF THE INVENTION

The present invention is related to a sensor arrangement for determining a location parameter of a body, which moves along a predefined path, at a given location.

BACKGROUND OF THE INVENTION

It is known practice to detect the current angle of rotation of a rotating body with the aid of magnetic Hall elements which are arranged along a circle circumference whose centre point is at right angles to the axis of rotation. For this purpose, the body is assigned a magnetic field, for example by connecting it to a magnet whose field strength varies at the sensor location on the basis of the sine of the angle of rotation. In this case, the Hall elements generate an electrical voltage, the so-called Hall voltage, which is both proportional to the magnetic field and to the bias current of the Hall elements, in accordance with the following formula for the Hall effect:

$$V_h = B \times I \times R_h,$$

where $V_h$ is the Hall voltage, B is the magnetic field, I is the bias current and $R_h$ is a constant for the Hall sensor. Hall sensors are usually operated using identical or matched constant bias currents. In order to detect the magnetic field of a simple, two-pole magnet, use may be made of two Hall sensors which provide two differential signals and are dependent, for example, on the sine or cosine of the angle of rotation to be determined.

A sensor arrangement having Hall elements is disclosed, for example, in U.S. Pat. No. 7,095,228. The individual sensors in the sensor arrangement are connected to signal modulators which make it possible to combine the individual sensor signals, the parameter to be detected being determined from all of the plurality of individual signals.

In typical applications, the sensor signals obtained (Hall voltages) are amplified. In order to accurately determine the angle or obtain higher resolution when determining the angle, interpolation is usually carried out. Said interpolation may be carried out in an IC, whose function is similar to that of an analogue/digital converter, by converting the analogue sine and cosine signals into analogue or digital signals which are at a higher angular frequency than that of the rotating body to be determined. One known sensor has, for example, a ten-bit output which requires 256-fold interpolation.

Different methods can be used for interpolation. A first possibility is to use conventional analogue/digital converters to convert the sensor signals into digital values which are proportional to the corresponding sensor signal, that is to say proportional to the sine or cosine value of the angle of rotation. The digital values can then be processed in digital function tables, for example CORDIC, and provide digital signals which are proportional to the angle of rotation to be determined.

A second method uses the sensor signals and directly converts them into digital values, a specially designed analogue/digital converter having the correct trigonometric characteristic being used. Digital values which are directly proportional to the angle to be determined are obtained as the result.

According to a third known method, the sensor signals are processed in the analogue domain in order to again obtain an analogue signal at a multiplied angular frequency. This may be carried out, for example, using a symmetrical mixer circuit, as is conventional in wireless communication terminals. The principle of such a symmetrical mixer is determined by the two following equations:

$$\sin 2\theta = 2 \sin \theta \cos \theta$$

$$\cos 2\theta = \cos^2\theta - \sin^2\theta,$$

where $\sin \theta$ and $\cos \theta$ are the sensor signals and $\sin 2\theta$ and $\cos 2\theta$ are the useful signals which are obtained at the mixer output and are at twice the angular frequency in comparison with the rotation of the body. It is clear that the function and quality of a symmetrical mixer depend on the ability of the mixer to multiply, add and subtract in the analogue domain. A mixer for wireless communication applications usually operates at constant frequencies and requires correspondingly narrowband circuits. In contrast to this, the frequency may vary from zero (no rotation) to a given maximum speed of rotation in the case of a rotational angle sensor. This makes it additionally necessary to design the corresponding circuits to be broadband circuits. An individual mixer stage is consequently used to double the angular frequency obtained at the output of the mixer in comparison with the input signal. After one or more mixer stages, the signal can then be processed using the digital methods already described further above. Alternatively, it is also possible to directly use the analogue signals obtained at the mixer output to determine the angle of rotation.

SUMMARY OF THE INVENTION

It is an object of the present invention to provide a sensor arrangement for determining a location parameter along a predefined path and, in particular, for determining an angle of rotation, which sensor arrangement is of simple design and allows improved interpolation.

This and other objects are attained in accordance with one aspect of the present invention directed to a sensor arrangement for determining a location parameter of a body (K), which moves along a predefined path, at the location X. A first sensor, which produces a first sensor signal that is proportional to the value sin(X), is located at a first sensor position relative to the value X. A first amplifier receives the first sensor signal that is proportional to sin(X) to generate a first control current. An identically designed second sensor is located at a second sensor position relative to the value X. The control current which is generated by the first amplifier is inputted to the second sensor.

Another aspect of the invention is directed to a method for determining the angle of rotation X of a body comprising the steps of: providing a first and a second sensor which are connected in a cascade, are offset with respect to one another in the direction of rotation of the angle of rotation X to be detected and are each dependent on the sine of the angle of rotation X; converting the sensor signal provided by the first sensor into a bias current that is applied to the second sensor the product of the applied bias current and the sin X function detected by the sensor being obtained as the sensor signal from the second sensor; and determining the value of X from the product in an evaluation unit.

The fundamental idea of the invention is to determine the location parameter sought using the value of a physical variable which produces a sinusoidal function along the predefined path. The intention now is to make it possible to multiply the angular frequency (based on a rotation corresponding to the sinusoidal function) in an integrated manner in an analogue stage of the sensor arrangement and to use the proportionality of the sensor behaviour to a bias current for this purpose. To this end, the sensor signal from a first sensor is used in the sensor arrangement to generate a bias current for a second sensor and the two sensor signals are thus multiplied. In this case, each sensor detects the physical variable, for example a magnetic field which varies sinusoidally over the predefined path. The location parameter to be determined can then be derived from the value of the physical variable.

A suitable sensor arrangement therefore comprises at least
one first sensor and
one second sensor which each provide a sensor signal which depends on the sine of the location parameter, and
a first amplifier which uses the first sensor signal to generate a first control current which is applied to the bias input of the second sensor.

A second sensor signal which depends on sin 2X can then be obtained at the second sensor. This allows determination of the associated location parameter to be determined at the location X with twice the level of accuracy since sin 2X can be processed with twice the level of accuracy with respect to X as compared with the simple sine function sin X. The location parameter is, for example, a section along the predefined path or the angle of rotation of a rotating body. The sensor arrangement therefore also makes it possible to determine the temporal change in the location or angle, that is to say the speed of the body when moved along the path or its frequency, with an improved level of accuracy.

Sensors having a sensor signal which depends on the sine of a variable to be determined, in particular an angle of rotation or location, can be used for the sensor arrangement. In principle, electrical or magnetic sensors, but particularly Hall sensors which can provide a perfectly linear dependence on the magnetic field and the bias current, are suitable for this purpose.

In this case, the use of the sensor arrangement to determine a location on a predefined path relative to a given starting point is analogous to determining an angle of rotation since a finite straight line can be considered to be a radial projection of a circular arc onto a straight line. The associated circular arc or the associated angle of rotation can therefore be derived from the finite straight line and vice versa. It is even possible to use the sensor arrangement to determine the location on a non-linear curve which is bent in any desired and varying manner if the course of the curve is known and each location along the curve can be mapped on a circular arc on a one-to-one basis.

It is advantageous to provide a magnetic field which varies sinusoidally along the path. This is achieved by alternately arranging two-pole magnet elements along the path. The value of the magnetic field (corresponds in this case to the physical variable) acting on the sensor arrangement changes with sinusoidal dependence on the location parameter X as a result of a relative movement of the sensor arrangement and the arrangement of the magnet elements.

A single two-pole magnet element which rotates relative to the sensor arrangement suffices for determining an angle of rotation.

In principle, it is possible either to leave the sensor arrangement stable with respect to a location and to move the arrangement of the magnet element(s) or, vice versa, to move the sensor arrangement relative to the stationary arrangement of magnet elements.

The first and second sensors are linked to one another in such a manner that the sensor signal from the first sensor can be used as a multiplier for the sensor signal from the second sensor. In the case of a Hall sensor, this can be effected in a simple manner by applying a control current (bias current) which is proportional to the sensor signal from the first sensor to the second Hall sensor. In the case of other sensors, the bias current can also be fed into an amplifier which amplifies the sensor signal in a manner proportional to the bias current. In all cases, the sensor arrangement provides, as the sensor signal at the second sensor, a function sin 2X which allows twice the level of accuracy when assigning the angle of rotation or location parameter from the sensor signal from the second sensor.

It is also possible to provide further sensors and cascade them in an appropriate manner. Such arrangements may then comprise n cascade stages in which at least one respective sensor is arranged. The sensors are provided at different sensor positions with respect to the angle of rotation X or the corresponding location parameter along a path, for example along a straight line. In the cascade, the sensors are connected to one another in such a manner that a bias current is applied to each sensor in a cascade stage m (where $1 < m \leq n$), said bias current being generated from the sensor signal from a sensor in an underlying cascade stage, for example from the sensor signal from stage m−1. The number n is 2 or 3, for example. However, up to 5 or even more cascade stages are also possible. The factor by which the angular frequency is multiplied and which is thus used to improve the accuracy when determining the angle of rotation respectively increases by one with each cascade stage. Therefore, in the case of n cascade stages, a sensor signal which is proportional to the value sin(nX) is obtained at the nth cascade stage.

It is advantageous to provide at least two sensors in the first cascade stage. This makes it possible, in the first cascade stage having the first sensors, to produce two different sensor signals, one of which depends on sin X and the other of which advantageously depends on cos X, with the result that the sensors can provide two orthogonal functions. This is because the location parameter X can only be exactly determined using at least two sensor signals. Two different sensor signals are in a ratio to one another, from which the location parameter of the location X can be exactly determined without an additional reference value.

In the cascade, at least four sensors can then be provided in the second cascade stage. A bias current which can be obtained from the respective control signals which are generated in the first stage and are proportional to sin X or cos X can then be selectively applied to said sensors. A control current from the preceding cascade stage can be respectively used, for example, as the bias current. However, it is also possible to produce the bias current by adding or subtracting different control currents, which can be realized in a particularly simple manner by connecting the current lines in an appropriate manner.

If suitable arrangements of the sensor positions of the individual sensors relative to the angle of rotation X are also selected together with such connection, this arrangement can be used to implement a perfectly symmetrical mixer function.

In comparison with known arrangements for determining the angle of rotation, a sensor arrangement which operates using Hall sensors has the advantage that the Hall elements have very good linear properties and can therefore be effectively used as multiplication elements. In addition, transimpedance amplifiers whose behaviour is well known and understood and which can be effectively implemented using conventional CMOS technology can be used as the amplifiers.

In one preferred embodiment, the entire sensor arrangement and the associated electronic circuits are integrated in a single integrated circuit (IC) which combines a mechanically and spatially stable relationship between the sensor positions of the individual Hall sensors with the technical advantages of integrated circuits.

The integrated circuit may also be provided with more complex functions, for example with Hall element offset cancellation, for example using current spinning.

If the sensors are arranged in a cascade with a plurality of respective sensors for each cascade stage, the sensors in a stage are preferably all arranged on the circumference of a circle, which has the axis of rotation of the body as the centre point, in order to determine an angle of rotation. In contrast, sensors in other cascade stages may be at a different distance from the axis of rotation but are each at the same distance from the axis inside a cascade stage.

Sensors for determining the location parameter along a non-circular and, in particular, linear path are preferably likewise arranged in a linear manner.

The sensor arrangement and the integrated circuit may also be operated in the time-division multiplex mode in a single cascade stage as regards the bias current. To this end, a control current is generated from the first sensor signal and is applied to the first sensor as a bias current in a temporally staggered manner (that is to say in the time-division multiplex mode). However, it is a prerequisite for this that the changeover operation in the time-division multiplex mode takes place in a considerably faster manner than the mechanical speed of rotation in order to avoid producing an additional error source.

The sensor arrangement may be designed in such a manner that the sum of all bias currents is independent of the input or output signal of the arrangement, with the result that good analogue performance can be achieved in the circuit and in the sensor arrangement and the power consumption is virtually constant.

The sensor arrangement may be used in three-phase applications, for example as a commutator in electric motors. The invention represents an extremely elegant (because it is integrated) and exact method of carrying out repeated interpolation of the sensors, which by far cannot be carried out so efficiently with external circuits.

A fundamental aspect of the invention is the selection of the sensor positions for the sensors inside a cascade stage. If k sensors are provided in a cascade stage, where $k \geq 2$, distribution of these sensors along a circle circumference, in which the relationships of the sensors as regards the angle of rotation are offset with respect to one another, is advantageous. The sensor positions are advantageously selected in such a manner that, for each cascade stage, one sensor can provide a sensor signal which depends on sin X and one sensor can provide a sensor signal which depends on cos X, or the sensors provide two orthogonal functions. However, it is also possible to arrange the sensors in a linear manner if the intention is to use them to determine a location on a linear path. The distance between the sensors is then advantageously matched to the distance between the magnet elements in order to ensure the suitable orthogonal phase relationships in this case too.

Optimum distribution of the sensors in each stage makes it possible to track the rotational movement or the corresponding "linear" movement of the body in different phase relationships which have been defined relative to one another, with the result that the different sensor signals provided by the different sensors can be used to optimally assign the angle of rotation or the analogue distance from the multiplicity of individual sensor signals. As already mentioned, the number of sensor signals which each indicate the same angle of rotation but with a different phase can be increased further by combining individual sensor signals by adding and subtracting the control currents. This is easily possible by connecting the sensor signals, or the control currents generated from the latter, in a serial and parallel manner and can thus be implemented in a simple manner.

The information provided by the sensor arrangement, that is to say the sensor signals from the last cascade stage or the control currents which are generated from these sensor signals from the last cascade stage, is supplied, for the purpose of determining the angle of rotation, to an evaluation unit which obeys one of the principles mentioned at the outset and uses the analogue signals to produce the digital value for the angle of rotation to be determined.

The invention is explained in more detail below using exemplary embodiments and the associated figures. The figures are used only for better understanding of the invention and are therefore only schematic and not true to scale. Therefore, the invention is not restricted to the exemplary embodiments either. Identical or identically acting parts are denoted using the same reference symbols.

DETAILED DESCRIPTION OF THE DRAWINGS

Figure 1:
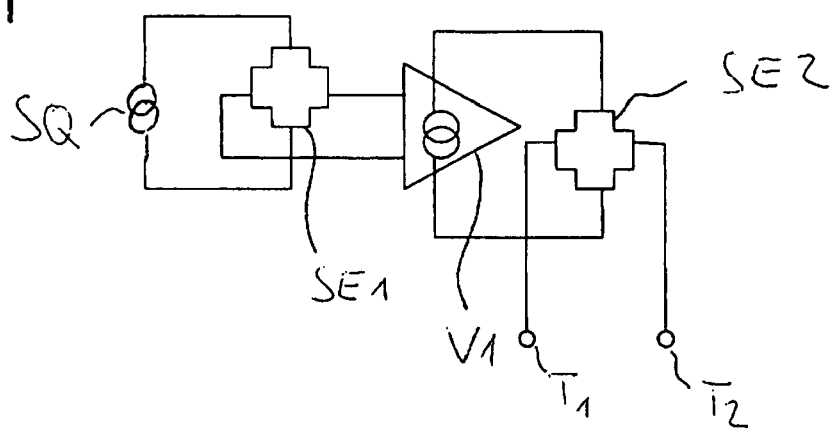
FIG. 1 shows an electrical circuit diagram of a sensor arrangement comprising two sensors.

FIG. 1 shows a simple embodiment of the invention, in which two sensors SE1, SE2 in the form of Hall elements are cascaded. A Hall element is a semiconductor element having four contacts which are arranged in the form of a cross on its surface corresponding to the xy plane of a coordinate system. If a voltage is applied to a first pair of contacts which are arranged along the virtual X axis, a bias current flows in the X direction from one contact to the other. If a magnetic field then acts on the Hall element in the Z direction, a voltage, the so-called Hall voltage, can be tapped off as the sensor signal from the two other contacts which are arranged in series on the Y axis.

Figure 7:
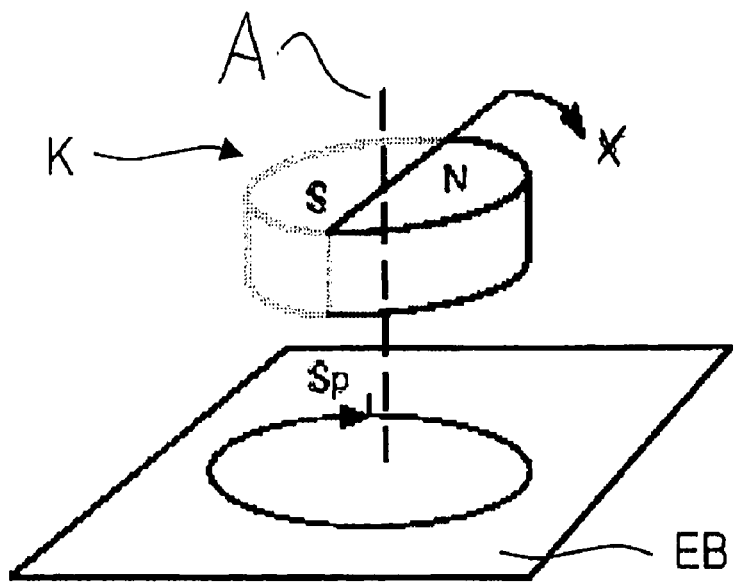
FIG. 7 shows the arrangement of the sensor plane and rotating body.

As illustrated in FIG. 7, for example, both sensors are then arranged in a plane EB perpendicular to the axis of rotation A of a rotating body K, preferably at the same distance from the axis of rotation A on the path Sp and preferably with a phase offset of 90 degrees with respect to the angle of rotation. A magnet is arranged on the axis of rotation A and is connected to the body K, with the result that its magnetic field can act in a perpendicular manner on the sensors (Hall elements) arranged in the sensor plane EB. A first control current is applied to the first sensor SE1 via a voltage source SQ.

The Hall voltage tapped off from the first sensor element SE1 is supplied to a first amplifier V1 which is in the form of a transimpedance amplifier. The analogue sensor signal is converted into a proportional control current therein. On account of the angular dependence of the control signal in the form of the function sin X, both the sensor signal and the control current produced by the amplifier V1 are proportional to sin X. The control current is then applied to the second sensor element SE2 as a bias current. The sensor signal from said second sensor element is applied to the two connections T1 and T2 as a Hall voltage and can be supplied for further processing or evaluation. In accordance with the dependence of the Hall voltage $V_h$ which was mentioned at the outset and corresponds to the equation $$V_h = B \times I \times R_h,$$

the Hall voltage (second sensor signal) at the second sensor element SE2 is produced as a product of the control current and the angular dependence of the sensor function of the Hall element. Depending on the phase offset of the second sensor element relative to the first sensor element (for example 90° in this case), a sensor signal which is proportional to sin X×cos X in this case can be tapped off from the connections T1, T2. According to the relationship $$2 \sin X \cos X = \sin 2X,$$

the sensor signal applied to the connections T1, T2 thus corresponds to a voltage that is proportional to the function sin 2X. The sensor arrangement thus provides the first of two values which can be used to clearly determine the angle of rotation X to be detected. A sensor signal which is proportional to the value cos 2X is required as a further partial value. It may be obtained in a simple manner in accordance with the relationship $$\cos 2X = \cos^2 X - \sin^2 X$$

by appropriately connecting two times two sensors in a similar manner to that illustrated in FIG. 1. In this case, the value sin X or cos X can be obtained from the sensor signal from the first sensor SE1 and can be applied to the second sensor as a bias current. In accordance with its angular dependence with respect to the angle of rotation to be determined and its relative arrangement with respect to the first sensor, the second sensor provides the product of the input function with a sin X or cos X function.

The two sensors may also be used in an analogous manner to determine the location parameter along a path or to determine a relative movement of the magnet and sensor arrangement.

Figure 2:
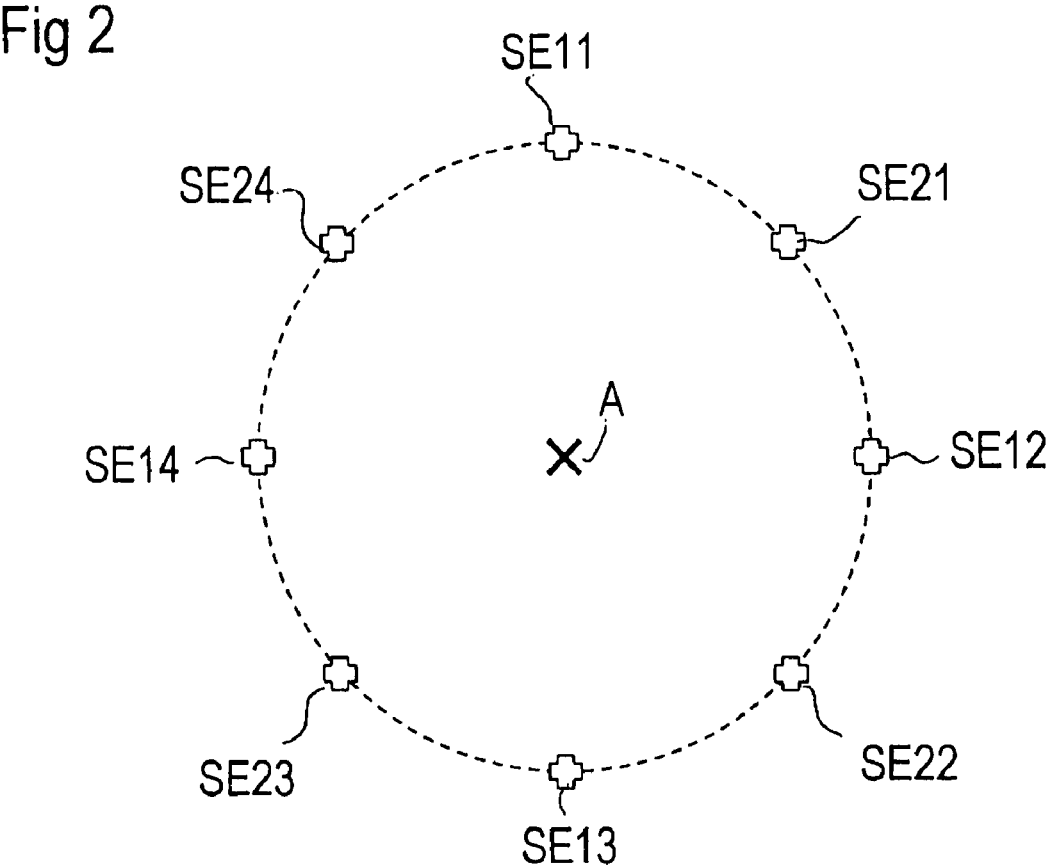
FIG. 2 shows the geometrical arrangement of eight sensors which are connected to one another in two cascade stages.

FIG. 2 shows the geometrical arrangement of a total of eight sensors which are connected in a sensor arrangement according to the invention. The arrangement provides all of the data needed to determine the angle of rotation in analogue form in the form of the corresponding sensor signals. All of the sensors are arranged on a common circular line around the axis of rotation A which is perpendicular to the plane of the circle having the sensors. All of the sensors are in the form of Hall elements and their X and Y axes have the same orientation. Four of the sensors SE11 to SE14 form the first cascade stage and are respectively offset by 90 degrees with respect to one another at the base of the circle. A further four sensors SE21 to SE24 form the second cascade stage, are likewise offset by 90 degrees with respect to one another and are each arranged between two sensors in the first cascade stage. All of the sensors SE1, SE2 in the entire sensor arrangement are thus evenly arranged along the circle circumference having the axis of rotation as the centre point.

In accordance with the arrangement of the respective sensor with respect to the angle X, the sensor signal from SE11 corresponds, for example, to sin X, whereas the sensor signal SE12 corresponds to the cos X function. The first sensor element SE21 which has been shifted through 45 degrees relative to SE11 provides a sensor signal which is proportional to sin(X+45°). The sensor element SE22 accordingly provides a sensor signal which is proportional to cos(X+45°).

Figure 3:
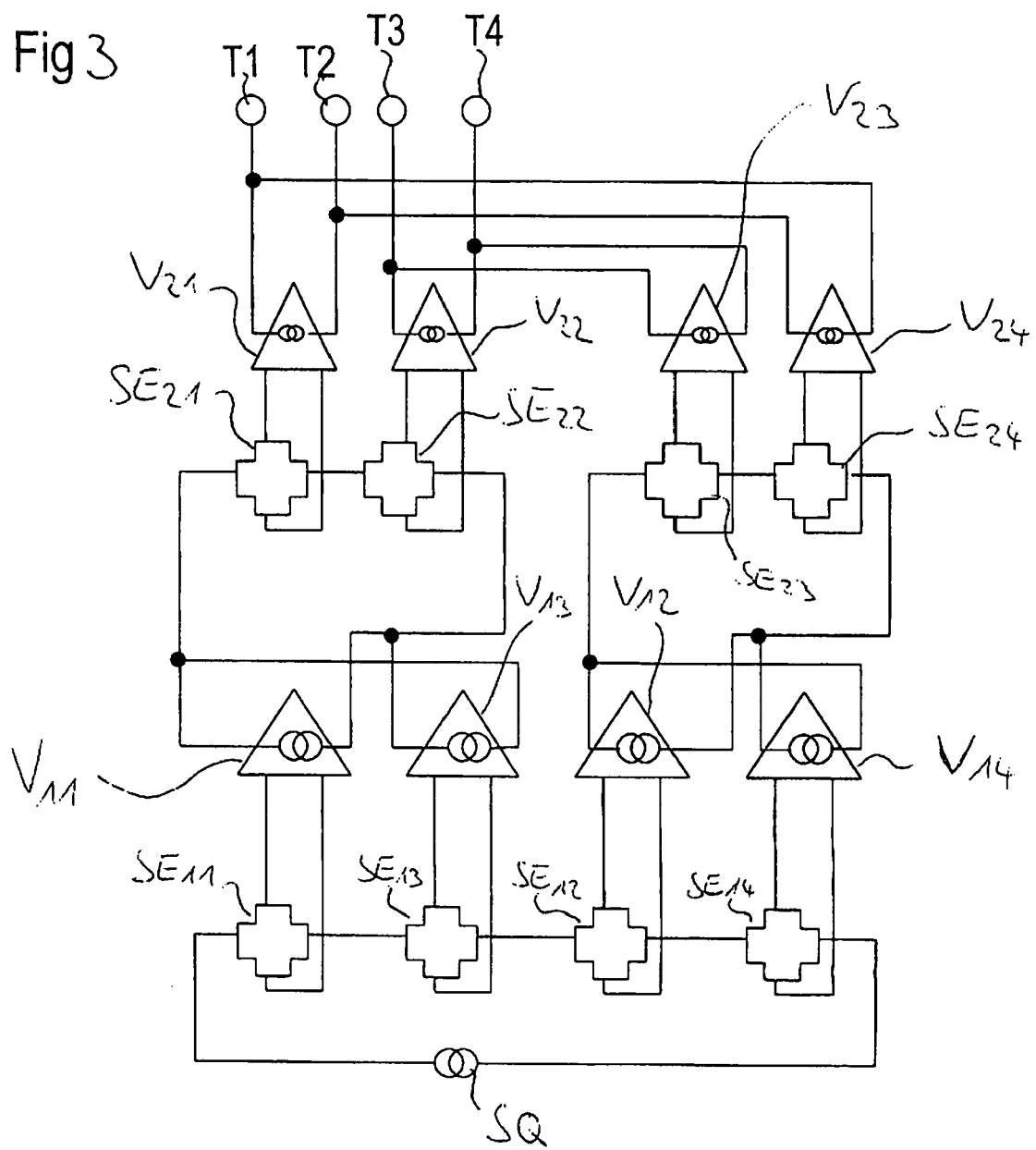
FIG. 3 shows an electrical circuit diagram of the same arrangement.

FIG. 3 shows a suitable connection in which the sensor elements SE in the first cascade stage can be connected to the sensor elements SE2 in the second cascade stage using interposed amplifiers V.

All of the sensor elements SE11 to SE14 in the first cascade stage are connected in series with a current source SQ in such a manner that the same bias current flows through all of these sensor elements. The sensor positions of the sensor elements SE11 and SE13 with respect to the axis of rotation A are offset by 180 degrees with respect to one another as regards the angle of rotation X and said sensor elements therefore provide, as sensor signals, voltages whose magnitudes are the same but which are opposite. A first amplifier V11 and V13 is used to convert these sensor signals into a control current which is applied to the output of the respective amplifiers and is proportional to the sensor signals. Control currents which are the same size but are opposite to one another are obtained in said two amplifiers V11 and V13. Therefore, these outputs of the two amplifiers V11 and V13 are reverse-connected in parallel, so that the currents can be added in phase.

The control currents which have been added and are proportional to sin X are applied to the second sensors SE21 and SE22 as bias currents. The second sensor SE21 has a phase offset of 45 degrees relative to the first sensor SE11. Accordingly, the sensor signal provided by this sensor is proportional to sin(X+45). The product with the bias current, which is proportional to sin X×sin(X+45), is therefore obtained at the output of the associated amplifier V21.

The second sensor SE22 has a phase offset of 90 degrees plus 45 degrees relative to the first sensor SE11, with the result that the corresponding sensor signal is proportional to cos(X+45). As a result of the applied bias current, the sensor signal then corresponds to the product sin X×cos(X+45°) which is converted into the corresponding current in the second amplifier V22.

In a corresponding manner, the first sensors SE12 and SE14 respectively provide a sensor signal which is proportional to cos X and a sensor signal which is proportional to −cos X, which, after conversion and amplification using the first amplifiers V12 and V14, are converted into control currents which are in turn applied, after being added in phase, to the second sensor elements SE23 and SE24 as bias currents. After the sensor signals received from SE12 and SE14 have been amplified by the amplifiers V23 and V24, currents which are proportional to the product cos X×(−sin(X+45)) are obtained at the output of the amplifier V23 and currents which are proportional to the product cos X×(−cos(X+45)) are obtained at the output of the amplifier V24.

Connecting the outputs of the second amplifiers V21 and V24 in parallel adds the corresponding currents at the connections T1 and T2, with the result that a current signal which is proportional to cos(2X+45) is obtained. The currents received from the second amplifiers V22 and V23 are added in a corresponding manner and provide a current which is proportional to sin(2X+45) at the connections T3, T4.

These two currents which depend on the sine of twice the angular frequency 2X and on cos 2X can be used to determine the value X in a simple manner and with twice the level of accuracy using an evaluation circuit.

Figure 4:
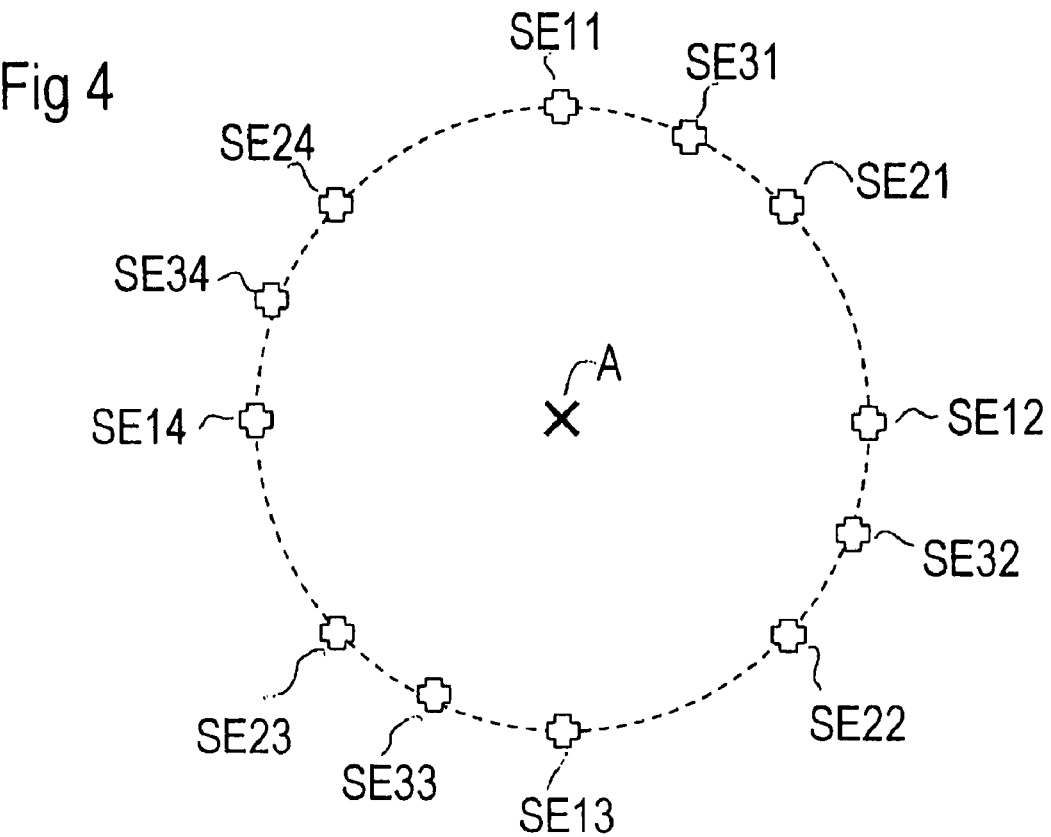
FIG. 4 shows an arrangement of twelve sensors which are connected in a three-stage cascade.

FIG. 4 shows an arrangement of twelve sensors which can be connected to one another in three cascade stages. In this case, the four sensors in each cascade stage are offset by 90 degrees with respect to one another inside the same stage. The sensors in the second cascade stage are offset by 45 degrees relative to those in the first cascade stage, whereas the sensors in the third cascade stage are offset by 22.5 degrees relative to the sensors in the first cascade stage. The two first sensors SE11 and SE13 provide a sine dependence of the sensor signal. After being amplified and converted into a control current, the control currents from SE11 and SE13 are added in an anti-parallel manner and are applied to the second sensor element SE21 as a bias current. The same current is applied in the opposite direction to the sensor element SE22. The control currents from SE12 and SE14 which have been added and amplified and depend on cos X are applied to the second sensor element SE23 as a bias current. In contrast, a bias current of the same magnitude as, but with a different sign to, the bias current is applied to the sensor SE24.

Control currents which can be obtained by adding two respective control currents from the second cascade stage are applied to the third sensors SE3 in the third cascade stage. The table below once again gives, for each sensor, the corresponding rotational angle position, the proportionality factor of the bias current, the origin of the bias current and the dependence of the sensor signal on the angle of rotation to be determined.

| Sensor | Angle position | Proportionality factor for control current | Composition of the bias current | Sensor signal obtained |
|---|---|---|---|---|
| SE11 | 0 | 1 | $I_{BIAS}$ | sinX |
| SE12 | 90 | 1 | $I_{BIAS}$ | cosX |
| SE13 | 180 | 1 | $I_{BIAS}$ | −sinX |
| SE14 | 270 | 1 | $I_{BIAS}$ | −cosX |
| SE21 | 45 | sinX | 0.5(I(SE11) − I(SE13)) | sinX sin(X + 45) |
| SE22 | 135 | −sinX | 0.5(I(SE13) − I(SE11)) | −sinX cos(X + 45) |
| SE23 | 225 | cosX | 0.5 × (I(SE12) − I(SE14)) | cosX (−sin(X + 45)) |
| SE24 | 315 | −cosX | 0.5x(I(SE14) − I(SE12)) | −cosX (−cos(X + 45)) |
| SE31 | 22.5 | sin(2X + 45) | I(SE22) + I(SE23) | sin(2X + 45) × sin(X + 22.5) |
| SE32 | 112.5 | −sin(2X + 45) | −I(SE22) − I(SE23) | −sin(2X + 45) × cos(X + 22.5) |
| SE33 | 202.5 | cos(2X + 45) | −I(SE11) − I(SE14) | cos(2X + 45) × (−sin(X + 22.5)) |
| SE34 | 292.5 | −cos(2X + 45) | I(SE11) + I(SE14) | −cos(2X + 45) × (−cos(X + 22.5)) |

It can be seen from the table that, unlike the general scheme, control currents which are obtained from the sensors in the first cascade stage are applied in this case to the sensors SE33 and SE34 as a bias current.

The third sensors in the third cascade stage SE3 provide sensor signals which can be converted into control currents which depend on sin 3X and cos 3X. If, for example, the control currents which are obtained at the amplifiers downstream of the third sensors SE32 and SE33 are added, a current which is proportional to sin(3X+45+22.5) results. In a corresponding manner, the control currents at the amplifiers which are assigned to the third sensors SE31 and SE34 can be added, thus obtaining a control current which is proportional to cos(3X+45+22.5). It is shown that the signals obtained all have an offset of 67.5 degrees relative to a virtual value to be determined, in a manner corresponding to the position of the first sensor element SE11. This offset can be corrected in a corresponding evaluation unit and is a constant property of the sensor arrangement illustrated in FIG. 4. However, correction is not necessary if the angle of rotation is not intended to be detected in absolute terms but rather relative to a particular point in time (starting point).

It is stressed that, in the two exemplary embodiments shown in FIGS. 2 and 4, addition and subtraction operations can be implemented with a high level of accuracy by connecting and reverse-connecting currents into an analogue circuit in a parallel manner. The sensors carry out the required multiplication operations, the most accurate and best results being achieved using Hall elements.

Figure 5:
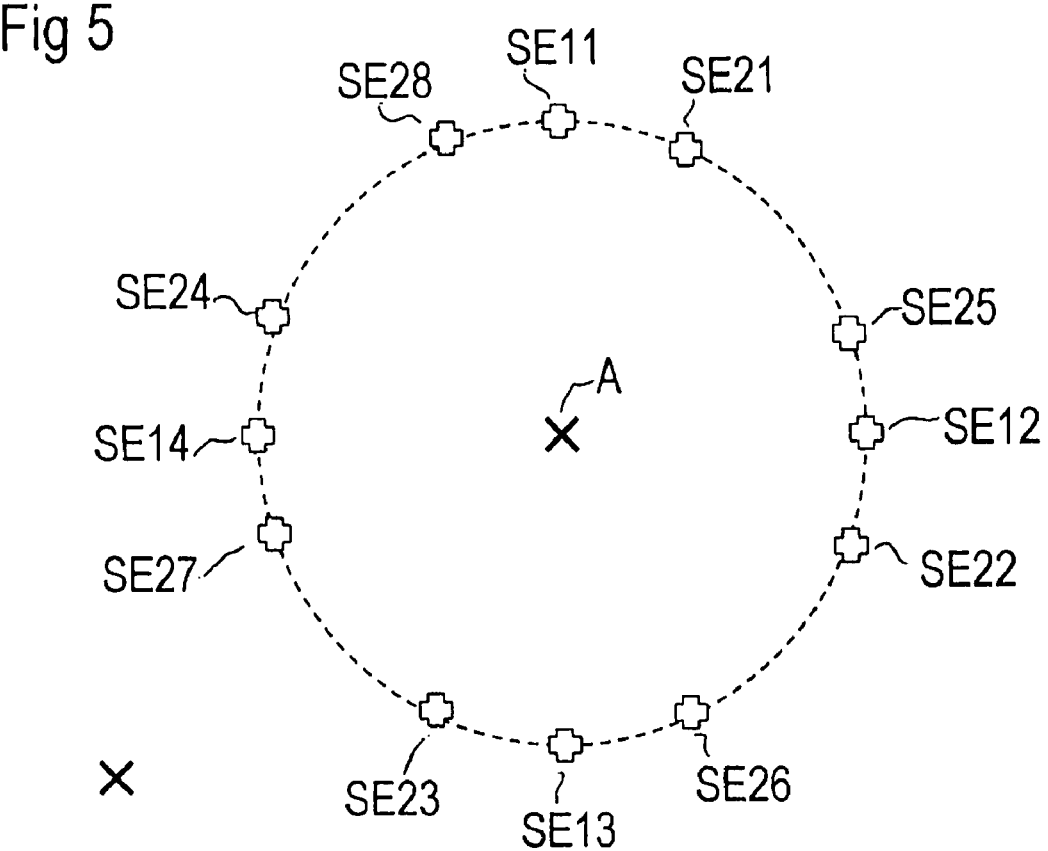
FIG. 5 shows another arrangement of twelve sensors which are cascaded in two stages.

FIG. 5 shows another exemplary embodiment of the invention and indicates a sensor arrangement in which four sensors in a first cascade stage are connected to eight sensors in a second cascade stage. The first sensors SE11 to SE14 are each offset by 90 degrees relative to one another. The first four sensors in the second cascade stage SE21 to SE24 are offset by 22.5 degrees relative to the first sensors SE1. In contrast, the second four sensors in the second cascade stage SE25 to SE28 are offset by −22.5 degrees relative to the first sensors.

The following table again gives, for all of the sensor elements, the position, bias current dependence, bias current composition and sensor signal obtained for the twelve sensors:

| Sensor | Angle position | Dependence of the bias current | Applied control currents | Sensor signal |
|---|---|---|---|---|
| SE11 | 0 | 1 | $I_{BIAS}$ | sinX |
| SE12 | 90 | 1 | $I_{BIAS}$ | cosX |
| SE13 | 180 | 1 | $I_{BIAS}$ | −sinX |
| SE14 | 270 | 1 | $I_{BIAS}$ | −cosX |
| SE21 | 22.5 | sin(X + 22.5) | I(SE11) − I(SE13) + I(SE12) − I(SE14) | sin(X + 22.5) sin(X + 45) |
| SE22 | 112.5 | cos(X + 22.5) | I(SE11) − I(SE13) − I(SE12) + I(SE14) | cos(X + 22.5) cos(X + 45) |
| SE23 | 202.5 | −sin(X + 22.5) | I(SE11) − I(SE13) + I(SE12) − I(SE14) | −sin(X + 22.5) sin(X + 45) |
| SE24 | 292.5 | −cos(X + 22.5) | I(SE11) − I(SE13) − I(SE12) + I(SE14) | −cos(X − 22.5) cos(X + 45) |
| SE25 | 67.5 | sin(X + 22.5 + 45) | I(SE12) − I(SE14) | sin(X + 22.5 + 45) cosX |
| SE26 | 157.5 | cos(X + 22.5 + 45) | I(SE11) − I(SE13) | cos(X + 22.5 + 45) sinX |
| SE27 | 247.5 | −sin(X + 22.5 + 45) | I(SE12) − I(SE14) | −sin(X + 22.5 + 45) cosX |
| SE28 | 337.5 | −cos(X + 22.5 + 45) | I(SE11) − I(SE13) | −cos(X + 22.5 + 45) sinX |

The stated connection makes it possible to interpolate the angle of rotation, which has been determined using the sensors, with a level of accuracy which is improved by a factor of two. The signals which are suitable for evaluation can be obtained by adding control currents. A first signal which is proportional to sin(2X+45+22.5) can be obtained by adding the control currents from the sensors SE25+SE27+SE26−SE28. A second signal which is proportional to the value cos(2X+45+22.5) is obtained using the following combination of control currents:

I(SE22)+I(SE24)−I(SE21)+I(SE23).

In this case too, all of the signals obtained in the second stage have an offset of 67.5 degrees relative to a reference point, which offset can be corrected as just stated.

Figure 6:
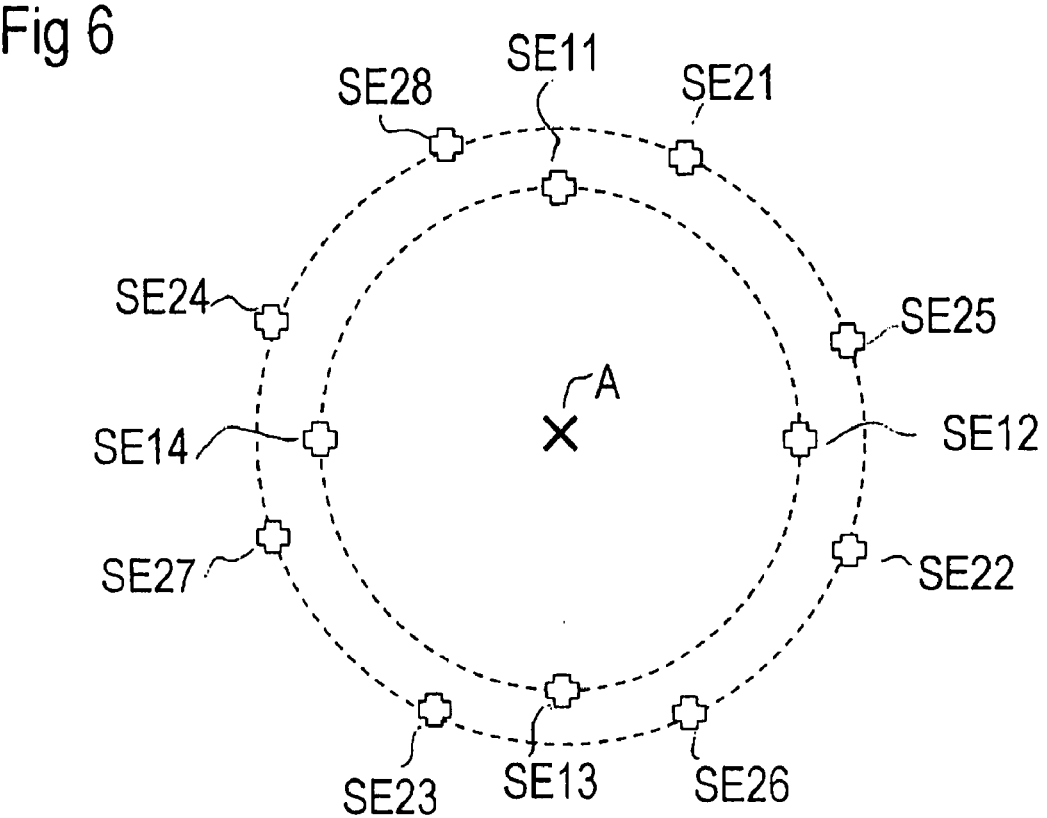
FIG. 6 shows another arrangement of twelve sensors in a two-stage cascade.

FIG. 6 shows a variation of the sensor arrangement illustrated in FIG. 5, in which all of the sensors in the second cascade stage are at a different distance from the axis of rotation A to the sensors in the first cascade stage SE1. If the sensors are connected to one another in this case in the same manner as in FIG. 5, the arrangement provides exactly the same result, at least the same relative dependence of the control currents.

FIG. 7 shows the arrangement of a magnet, which is intended to correspond to the body K in this case, above the sensor plane EB. The sensors are arranged along a path Sp, for example. The location parameter X which corresponds to a circular arc relative to a reference point or the associated angle of rotation is determined.

Figure 8:
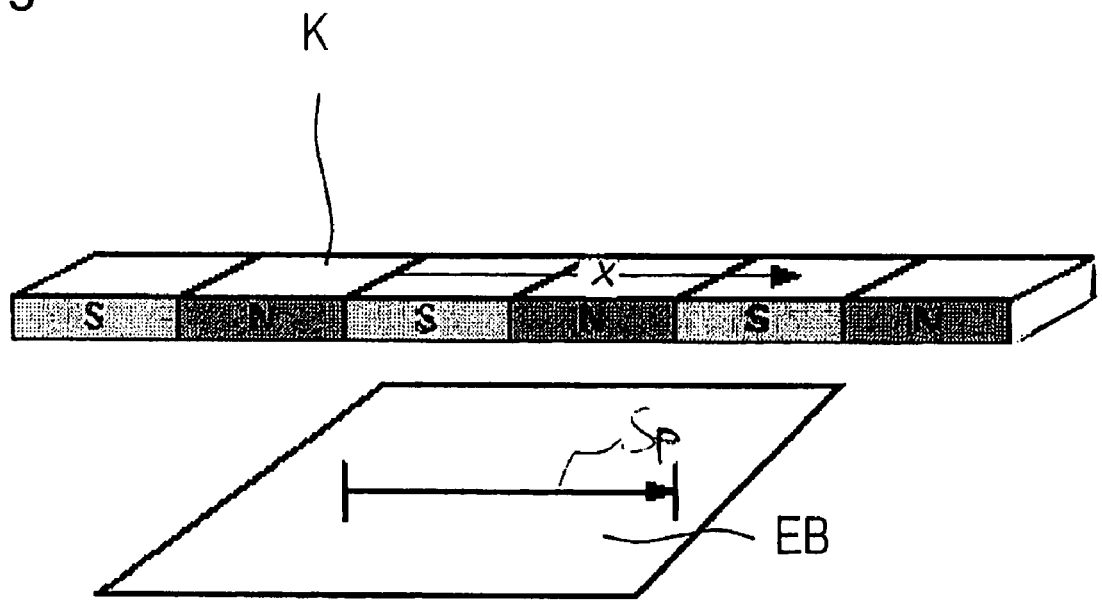
FIG. 8 shows the arrangement of magnet elements relative to the sensor plane.

FIG. 8 shows magnetic elements (poles) which are arranged in an alternating manner in terms of their polarity, are oriented along a path Sp and are connected to the body whose location parameter along the path Sp is to be determined, or represent said body. The relative movement or the relative position between the sensor plane EB and the body K is always measured. Each sensor SE on the path Sp is exposed to a sinusoidally varying magnetic field in the case of a relative movement along the path Sp and provides a correspondingly proportional sensor signal. The value of the sensor signal at a location with the location parameter X therefore corresponds to a value sin(X+C), where C is a constant and depends on the selection of the reference point and the relative sensor position. In order to relate the linear location coordinate (location parameter X) to the period of the magnet elements or the arrangement, X can be arithmetically standardized. This is achieved by converting the value X into the standardized value $X_N$ in accordance with $X_N=2\pi X/X_p$, where $X_p$ is the length of the "magnetic period" in the arrangement of magnet elements, that is to say the distance between two identical poles in the case of a regular arrangement.

Various possible ways of respectively grouping rotational angle sensors and, in particular, Hall elements in an array around the axis of rotation A and connecting them to one another in cascades in such a manner that a factor—which is increased by one—for the accuracy of the determination of the angle of rotation, which can be achieved using the sensor arrangement, is obtained for each cascade stage were presented using the exemplary embodiments. The offset of the sensors in the different cascade stages, which was selected in the exemplary embodiments, is not restricted to the values described, but evaluation is facilitated using the exemplary embodiments described. In addition, the sensors need not be in the form of Hall elements. Other sensors having a mathematically accurate dependence on the sine of the angle of rotation to be determined are also suitable, the sensors also being modified with the value of the preceding cascade stage or with the value of the sensor in the preceding cascade stage with the aid of an appropriately connected amplifier element if they are operated directly and without a bias current.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A sensor arrangement for determining a location parameter of a body (K), which moves along a predefined path, at the location X, comprising:
   a first sensor, which produces a first sensor signal that is proportional to the value sin(X), located at a first sensor position relative to the value X;
   a first amplifier, which receives the first sensor signal that is proportional to sin(X) to generate a first control current;
   an identically designed second sensor located at a second sensor position relative to the value X;
   wherein the control current which is generated by the first amplifier is inputted to the second sensor.

2. The sensor arrangement according to claim 1, in which a plurality of sensors which are provided at different sensor positions are connected in an n-stage cascade in such a manner that a bias current is respectively applied to at least one sensor in an mth cascade stage, where $1<m\leq n$, said bias current being generated from the sensor signal from one or more sensors arranged in the underlying cascade stage m−1, where $1<n<5$.

3. The sensor arrangement according to claim 2, in which at least two sensors are provided in the first cascade stage, and at least four sensors are provided in the second cascade stage or in all higher cascade stages.

4. The sensor arrangement according to claim 2,
   in which each stage of the cascade contains two sensors which are offset with respect to the respective sensor in the same cascade stage as regards the value x,
   in which a bias current which is produced from the difference or sum of control currents which are each obtained from sensors arranged in the preceding cascade stage is applied to each sensor in a higher stage m of the cascade.

5. The sensor arrangement according to claim 2,
   in which k sensors are provided in each cascade stage, where $k \geq 2$,
   a bias current which is produced from the difference or sum of the control currents from two sensors in the respective preceding cascade stage being applied to each sensor in a higher stage m of the cascade, and
   another difference or sum of control currents from the preceding cascade stage being applied to each sensor in this higher cascade stage.

6. The sensor arrangement according to claim 2,
   in which k sensors which are offset with respect to one another as regards the variable X to be determined are provided in each cascade stage, where $k \geq 2$.

7. The sensor arrangement according to claim 2,
   in which an evaluation unit is provided,
   in which at least two sensor signals or control currents which are provided by the sensors or amplifiers in the nth and thus last cascade stage are applied to the input of the evaluation unit, and
   the evaluation unit determining the value of the angle of rotation X from the input signals which depend on sin (n*X) and cos(n*X).

8. The sensor arrangement according to claim 1, in which all of the sensors in the cascade are in the form of magnetic Hall sensors.

9. The sensor arrangement according to claim 1, in which all of the sensors are arranged on a common printed circuit board.

10. The sensor arrangement according to claim 1, in which all of the sensors in a cascade stage are at the same distance from an axis of rotation of the body.

11. The sensor arrangement according to claim 10, in which all of the sensors in different cascade stages are at a different distance from the axis of rotation (A) of the body.

12. The sensor arrangement according to claim 1,
in which the amplifiers are in the form of transimpedance amplifiers.

13. A method for determining the angle of rotation X of a body comprising the steps of:
providing a first and a second sensor, which are connected in a cascade, are offset with respect to one another in the direction of rotation of the angle of rotation X to be detected and are each dependent on the sine of the angle of rotation X;
converting the sensor signal provided by the first sensor into a bias current that is applied to the second sensor, the product of the applied bias current and the sin X function detected by the sensor being obtained as the sensor signal from the second sensor; and
determining the value of X from the product in an evaluation unit.

14. The according to claim 13, comprising:
providing two first sensors whose offset as regards the angle of rotation X is selected in such a manner that the sensor signal in one sensor depends on sin X and the sensor signal in the other sensor depends on cos X, and
generating bias currents from the sensor signals from the two first sensors and are applied to at least two second sensors.

15. The method according to claim 14, comprising:
providing a plurality of first sensors (SE1) which are each offset with respect to one another as regards the angle of rotation x, and
obtaining the bias currents for the respective higher cascade stage m by adding or subtracting the respective sensor signals, or the currents generated from the latter, from the previous cascade stage m−1.

16. The method according to claim 13,
in which magnetic Hall sensors are used as the sensors, and
in which the Hall voltage which depends on sin x and is produced by each first sensor as a sensor signal is converted into a control current using an amplifier and is used as the bias current for the second sensors.

17. The method according to claim 13,
in which third sensors are provided, control currents which are generated from the sensor signals from the second sensors being applied as bias currents to said third sensors, and
in which the evaluation unit is fed with the sensor signals from the third sensors or with currents which are generated therefrom.

18. The method according to claim 13,
in which first and further sensors are arranged in a linear manner, and
the location X of the body being determined from the angular relationships between a body, which is connected to a magnet, and the different sensors by converting it from an angle which is determined with the sensor arrangement by converting the associated circular arc to the location obtained by radial projection.

* * * * *